US011293216B2

(12) United States Patent
Ettrich et al.

(10) Patent No.: US 11,293,216 B2
(45) Date of Patent: *Apr. 5, 2022

(54) PANEL DOORS AND RELATED METHOD

(71) Applicant: Masonite Corporation, Tampa, FL (US)

(72) Inventors: Jan H. Ettrich, Geneva, IL (US); Hubert Breton, Wheaton, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,910

(22) Filed: Aug. 24, 2020

(65) Prior Publication Data
US 2020/0386043 A1 Dec. 10, 2020

Related U.S. Application Data

(63) Continuation of application No. 16/369,245, filed on Mar. 29, 2019, now Pat. No. 10,753,143.

(Continued)

(51) Int. Cl.
*E06B 7/14* (2006.01)
*E06B 3/663* (2006.01)
(Continued)

(52) U.S. Cl.
CPC .............. *E06B 7/14* (2013.01); *E06B 3/5409* (2013.01); *E06B 3/5454* (2013.01);
(Continued)

(58) Field of Classification Search
CPC ........ E06B 7/14; E06B 3/5409; E06B 3/5454; E06B 3/66304; E06B 3/74; E06B 3/5892; B32B 21/14
See application file for complete search history.

(56) References Cited

U.S. PATENT DOCUMENTS 4,327,535 A ‡ 5/1982 Governale ............ E06B 3/5892
49/501
5,086,601 A ‡ 2/1992 Galowitz ................ E06B 3/984
52/204
(Continued)

FOREIGN PATENT DOCUMENTS

CN 104454857 A ‡ 3/2015
CN 104454857 A 3/2015
(Continued)

OTHER PUBLICATIONS

Search Report and Written Opinion for PCT/US2019/024816 (9 pages). (Year: 2019).‡

*Primary Examiner* — Rodney Mintz
(74) *Attorney, Agent, or Firm* — Berenato & White, LLC

(57) ABSTRACT

A door is provided that includes a door panel having a periphery and opposite first and second panel surfaces, stiles and rails collectively surrounding the panel, and sealant. The stiles have channeled stile surfaces extending across a thickness of the stiles and facing one another. The rails have channeled rail surfaces extending across a thickness of the rails and facing one another. The channeled stile surfaces and the channeled rail surfaces include channels with open ends that receive the periphery of the panel, first grooves positioned at first interfaces of the first panel surface and first edges of the open ends of the channels, and second grooves positioned at second interfaces of the second panel surface and second edges of the open ends of the channels. The sealant is received in the first and second grooves, preferably forming a water-proof seal.

19 Claims, 4 Drawing Sheets

Related U.S. Application Data

(60) Provisional application No. 62/650,152, filed on Mar. 29, 2018.

(51) Int. Cl.
  *E06B 3/74* (2006.01)
  *E06B 3/54* (2006.01)
  *B32B 21/14* (2006.01)
  *E06B 3/58* (2006.01)

(52) U.S. Cl.
  CPC ............ *E06B 3/66304* (2013.01); *E06B 3/74* (2013.01); *B32B 21/14* (2013.01); *E06B 3/5892* (2013.01)

(56) References Cited

U.S. PATENT DOCUMENTS

| | | | | |
|---|---|---|---|---|
| 5,584,154 | A | ‡ | 12/1996 | Koepke ................ E06B 3/9616 403/288 |
| 7,188,456 | B2 | ‡ | 3/2007 | Knauseder .......... E04F 13/0878 52/592 |
| 9,458,660 | B2 | * | 10/2016 | Gouge ................ E06B 3/6621 |
| 9,863,181 | B2 | ‡ | 1/2018 | Bourassa ............. E06B 3/7015 |
| 9,976,340 | B2 | ‡ | 5/2018 | Bourassa ................ E06B 3/74 |
| 10,753,143 | B2 | | 8/2020 | Ettrich |
| 2006/0283121 | A1 | ‡ | 12/2006 | Graboyes ................ E06B 3/74 52/455 |
| 2007/0039159 | A1 | ‡ | 2/2007 | Galbreath ............. F16B 12/125 29/458 |
| 2007/0251174 | A1 | ‡ | 11/2007 | Chung ..................... E06B 3/74 52/455 |
| 2008/0245003 | A1 | * | 10/2008 | Kon ..................... E06B 3/5892 52/208 |
| 2016/0010386 | A1 | * | 1/2016 | Gouge ..................... E06B 3/70 52/784.16 |
| 2017/0145735 | A1 | ‡ | 5/2017 | Bourassa ................ E06B 3/725 |
| 2017/0145736 | A1 | ‡ | 5/2017 | Bourassa ................. E06B 3/74 |
| 2018/0030776 | A1 | ‡ | 2/2018 | Vaidya .................... E06B 3/822 |
| 2019/0301235 | A1 | * | 10/2019 | Ettrich ................. E06B 3/5409 |

FOREIGN PATENT DOCUMENTS

| | | | | |
|---|---|---|---|---|
| CN | 104481992 | A ‡ | 4/2015 | |
| CN | 104481992 | A | 4/2015 | |
| CN | 104500529 | A ‡ | 4/2015 | |
| CN | 104500529 | A | 4/2015 | |
| DE | 10009853 | A1 ‡ | 8/2001 | .......... A47B 96/145 |
| DE | 10009853 | A1 | 8/2001 | |
| DE | 102012000515 | A1 ‡ | 7/2013 | ............. E06B 3/984 |
| DE | 102012000515 | A1 | 7/2013 | |
| DE | 102012009035 | A1 ‡ | 9/2013 | ............. F16B 12/24 |
| DE | 102012009035 | A1 | 9/2013 | |
| EP | 0426402 | A2 ‡ | 5/1991 | .......... E05B 65/104 |
| EP | 0426402 | A2 | 5/1991 | |
| EP | 2933507 | A1 ‡ | 10/2015 | ............. E06B 3/984 |
| EP | 2933507 | A1 | 10/2015 | |

\* cited by examiner
‡ imported from a related application

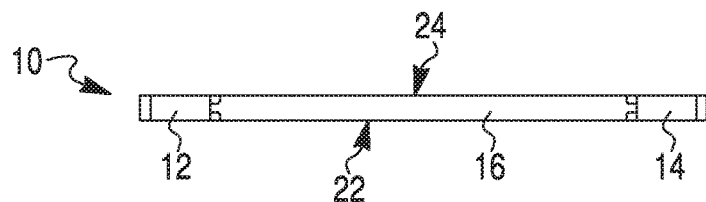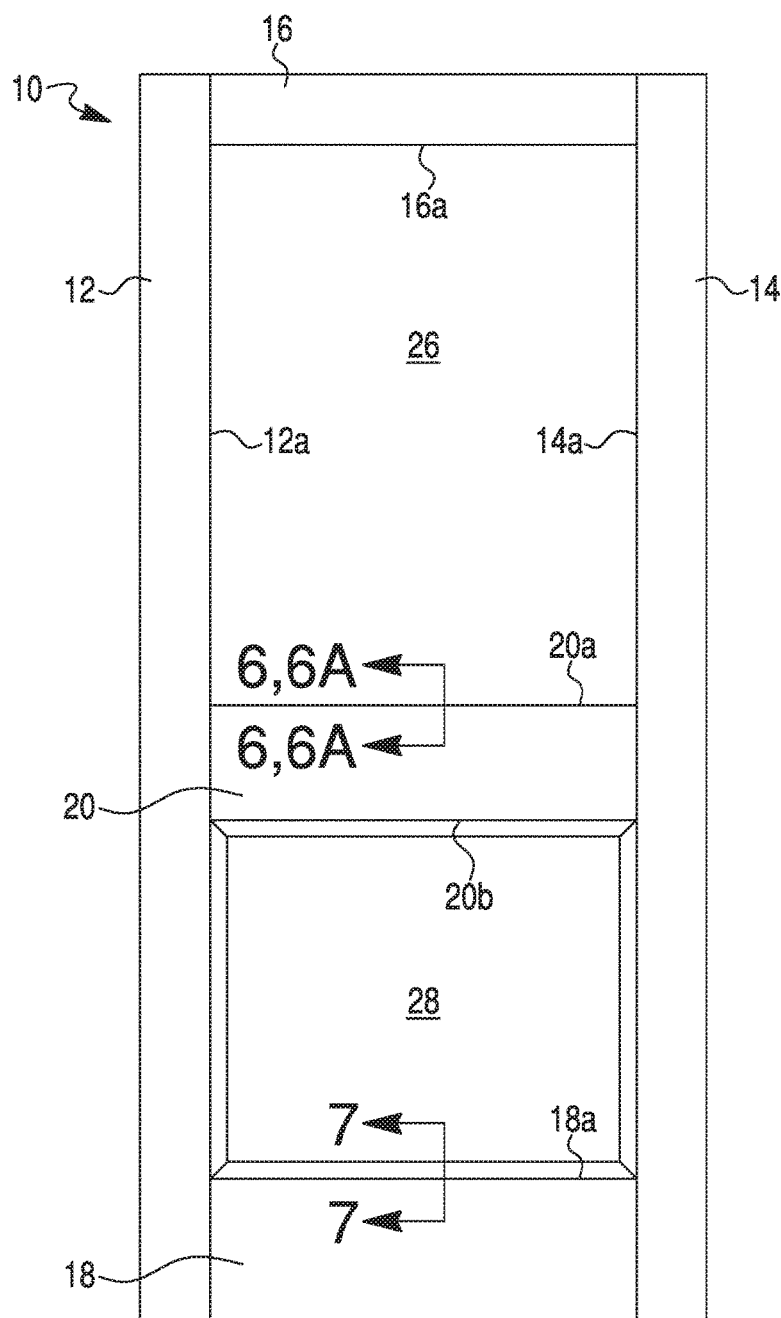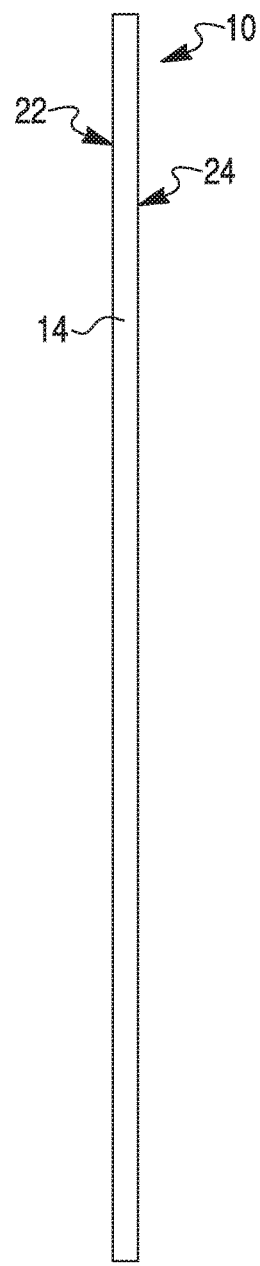

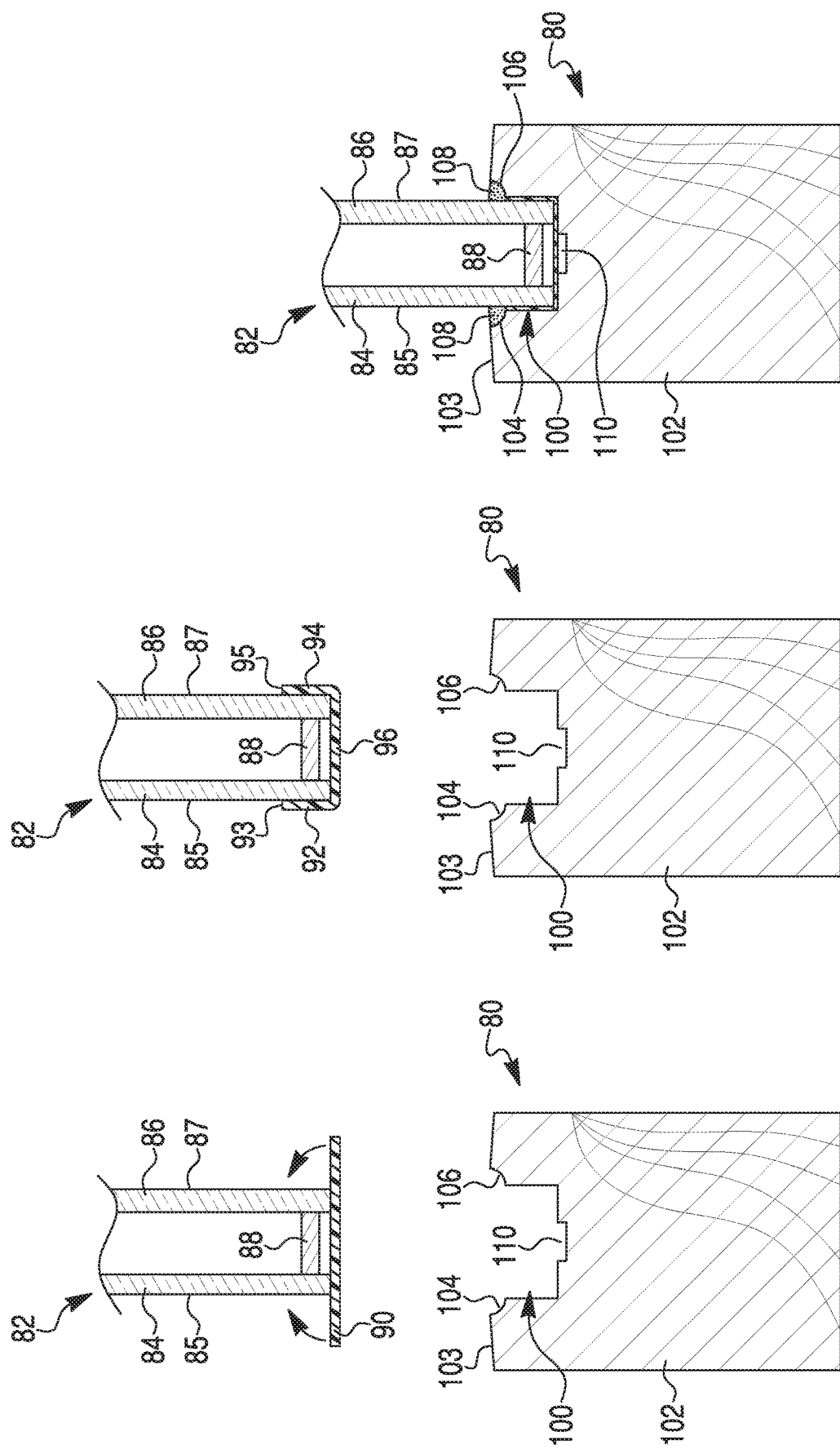

PANEL DOORS AND RELATED METHOD

CLAIM(S) OF PRIORITY AND CROSS-REFERENCE TO RELATED APPLICATION(S)

This application is a continuation of U.S. patent application Ser. No. 16/369,245, filed Mar. 29, 2019, now U.S. Pat. No. 10,753,143, which claims the benefit of priority of U.S. Provisional Application No. 62/650,152 filed Mar. 29, 2018, the complete disclosure of which is incorporated herein by reference.

FIELD OF THE INVENTION

This invention relates to panel doors, and in particular relates to panel doors made, at least in part, of wood and/or wood composite. The invention also relates to a method of making the panel doors.

BACKGROUND

Problems associated with wood and wood composite doors include delamination, veneer splits, panel cracking, joint separation, wood decay, and insulated glass seal failures. Water infiltration is a root cause for many of those problems, and water infiltration is sometimes caused by stile and rail components of the door expanding and contracting at different rates than panel components in response to extreme weather. The invention therefore seeks to provide wood and wood composite panel doors that exhibit improved overall weatherability and that are resistant to water infiltration.

SUMMARY OF THE INVENTION

Panel doors according to the invention exhibit improved weatherability at least in part because resilient sealant is located in oppositely disposed grooves in the peripheral frame adjoining the panel in order to allow movement of the panel relative to the surrounding frame so that water infiltration is thereby prevented. The resilient sealant accommodates the relative motion and thus splitting, cracking and the like at the joint is prevented.

According to a first embodiment of the invention, a door is provided that includes a door panel having a periphery and opposite first and second panel surfaces, stiles and rails collectively surrounding the panel, and sealant. The stiles have channeled stile surfaces extending across a thickness of the stiles and facing one another. The rails have channeled rail surfaces extending across a thickness of the rails and facing one another. The channeled stile surfaces and the channeled rail surfaces include channels with open ends that receive the periphery of the panel, first grooves positioned at first interfaces of the first panel surface and first edges of the open ends of the channels, and second grooves positioned at second interfaces of the second panel surface and second edges of the open ends of the channels. The sealant is received in the first and second grooves.

A second embodiment of the invention provides a door that includes a door panel having a periphery and opposite first and second panel surfaces, stiles and rails collectively surrounding the panel, and sealant. The stiles have channeled stile surfaces extending across a thickness of the stiles and facing one another. The rails have channeled rail surfaces extending across a thickness of the rails and facing one another. The channeled stile surfaces and the channeled rail surfaces include channels with open ends that receive the periphery of the panel, first grooves positioned at first interfaces of the first panel surface and first edges of the open ends of the channels, and second grooves positioned at second interfaces of the second panel surface and second edges of the open ends of the channels. The sealant has a sealant width, is received in the first and second grooves to establish waterproof seals at the first and second interfaces, and has a joint movement capability of at least 25% of the sealant width to permit limited movement of the door panel relative to the stiles and the rails at the first and second interfaces without breaking the waterproof seals.

Other embodiments and aspects of the invention, including apparatus, devices, doors, door parts, kits, processes, and the like which constitute part of the invention, will become more apparent upon reading the following detailed description of the exemplary embodiments.

BRIEF DESCRIPTION OF THE DRAWING(S)

The accompanying drawings are incorporated in and constitute a part of the specification. The drawings, together with the general description given above and the detailed description of the exemplary embodiments and methods given below, serve to explain the principles of the invention. In such drawings:

FIG. 1 is an elevational view of a door according to an embodiment of the invention;

FIG. 2 is a right side view of the door of FIG. 1, with the left side view being identical to the right side view;

FIG. 3 is an overhead plan view of the door of FIG. 1, with the bottom view being identical to the overhead plan view;

FIGS. 10, 11, and 12 show steps of a door-making method for making a door according to yet another embodiment of the invention.

DETAILED DESCRIPTION OF THE EXEMPLARY EMBODIMENTS AND EXEMPLARY METHODS

Figure 5:
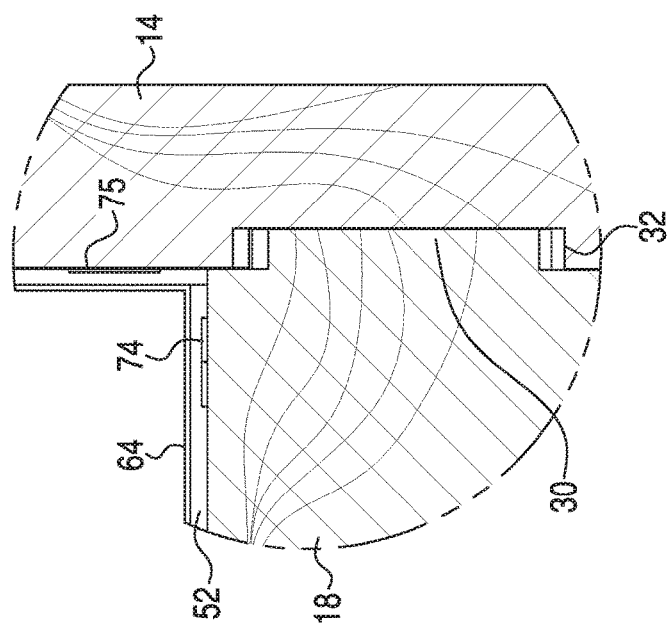
FIG. 5 is an enlarged fragmented view of circle 5 of FIG. 4.

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods.

As best shown in FIGS. 1 and 2, a solid door 10 includes a first stile 12 and a second stile 14 arranged parallel to one another and spaced apart from one another. The stiles 12 and 14 extend the full length/height of the door 10. A top rail 16, a bottom rail 18, and an intermediate (lock) rail 20 extend parallel to one another between and perpendicular relative to the stiles 12 and 14. The door 10 is frameless, i.e., it does not contain an internal frame on which skins are secured. Generally, doors of the type shown and described in FIG. 1 are referred to as solid doors.

The door 10 further includes an upper panel 26 and a lower panel 28. The upper panel 26 is surrounded by the first and second stiles 12 and 14 and the top and intermediate rails 16 and 20. Likewise, the lower panel 28 is surrounded by the first and second stiles 12 and 14 and the bottom and intermediate rails 18 and 20. Although the door 10 is shown with two panels 26 and 28, it should be understood that the door 10 may include one, two, three, four, or more panels. Similarly, the door 10 may include none, one, two, or more intermediate stiles and none, one, two, or more intermediate rails. The panels 26 and 28 may have the same or different sizes and shapes relative to one another, and may be stacked (as shown), placed in side-by-side relationship, or a combination thereof. The panels 26, 28 typically are planar and made of solid wood, although they may be a wood composite, such as made from medium density fiberboard, hardboard and the like.

A first surface 22 (FIGS. 2 and 3) of the door 10 is comprised of exterior surfaces of the stiles 12 and 14, the rails 16, 18, and 20, and the panels 26 and 28 exposed on a first side of the door 10. An opposite second surface 24 is comprised of second surfaces of the stiles 12 and 14, the rails 16, 18, and 20, and the panels 26 and 28 exposed on a second side of the door 10. The first and second surfaces 22 and 24 may include a wood grain appearance. Generally, the wood grain appearance of the surfaces 22 and 24 at the stiles 12 and 14 extends perpendicular to the wood grain appearance of the surfaces 22 and 24 at the rails 16, 18, and 20. Likewise, the surfaces of the panels 26, 28 may have a wood grain pattern, frequently of a species that matches the wood species of the stiles 12, 14 and rails 16, 18 and 20. The upper and lower panels 26, 28 preferably are wood or a wood composite.

Figure 4:
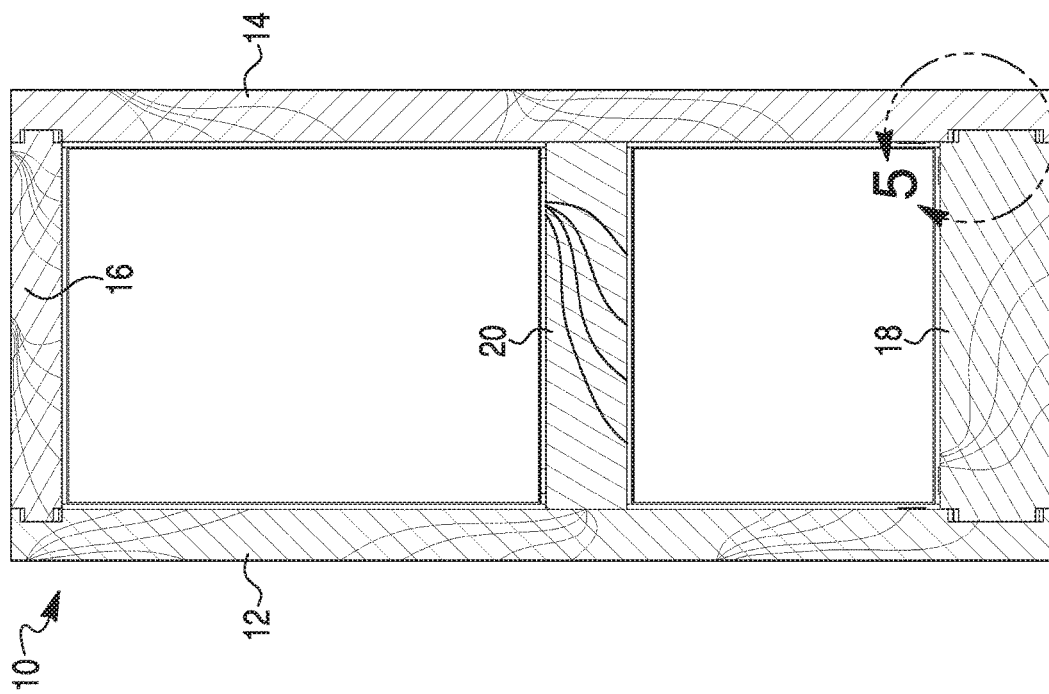
FIG. 4 is a vertical cross section of stiles and rails of the door of FIG. 1 with upper and lower panels of the door not shown for clarity.

As best shown in FIGS. 4 and 5, the stiles 12 and 14 may be joined to the rails 16, 18, and 20 by tenon-and-mortise joints. In the illustrated embodiment, the opposite ends of the rails 16, 18, and 20 are provided with tenons, including for example tenon 30 shown in the enlarged view of FIG. 5. The stiles 12 and 14 are provided with closed mortises, including for example closed mortise 32 shown in the enlarged view of FIG. 5. The tenons 30 are received in the closed mortises 32 in a manner known in the art. The mortises 32 may be slightly larger than the tenons 30 to allow for manufacturing tolerances. Although not shown, adhesive may be included in the joints to secure the stiles 12 and 14 to the rails 16, 18, and 20. Closed mortise assemblies provide excellent mechanical resistance when the door 10 is cycled and slammed during testing, and improve resistance to overall warping by components, such as stiles 12, 14, rails 14, 16 and 18, and panels 26, 28 of the door 10. It should be understood that, in the alternative, the stiles 12 and 14 may be provided with the tenons 30 and the rails 16, 18, and 20 may be provided with the mortises 32. Other joints may also be used instead of or in addition to the tenon-and-mortise joints.

The stiles 12 and 14 and the rails 16, 18, and 20 preferably are solid wood members that each extend in thickness between the opposite surfaces 22 and 24 of the door 10. Likewise, the panels 26 and 28 are preferably solid wood members that extend in thickness between the opposite surfaces 22 and 24 of the door 10. The door 10 is preferably of a solid wood construction without a core or core cavity. In particularly exemplary embodiments, any one or combination of the stiles 12 and 14 and the rails 16, 18, and 20 and/or any one or combination of the panels 26 and 28 are made of a multiple ply wood (or plywood) or wood composite material.

Figure 8:
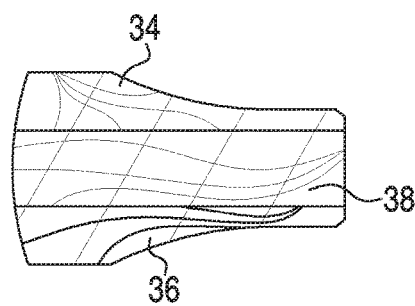
FIG. 8 is a fragmentary cross-sectional view of a laminate according to an embodiment of the invention.
Figure 9:
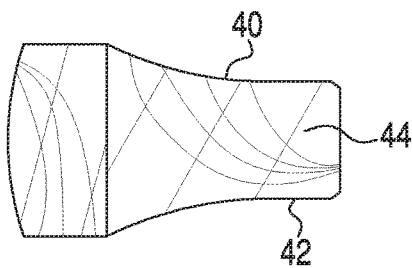
FIG. 9 is a fragmentary cross-sectional view of a laminate according to another embodiment of the invention.

FIG. 8 illustrates a sandwich panel construction for the panels 26, 28 including outer wood plies 34 and 36 and central MDF (medium density fiberwood) ply or core 38. This sandwich panel construction minimizes shrinking and swelling of the panels 26, 28. Further, the wood-composite (MDF) middle layer 38 has a lower linear expansion rate in response to extreme weather than solid wood, so that the middle layer 38 limits the expansion rate of the entire panel 26, 28 while undergoing enough expansion to relieve internal stresses in the outer wood layers 34, 36 caused by their expansion and thereby preventing cracking. The overall expansion rate of the panels 26, 28 prevents the seals (described below) from failing. FIG. 9 illustrates another exemplary embodiment of a three-ply lumber veneer laminate (LVL) having outer wood veneers 40 and 42 and a central MDF ply or core 44. Moisture-resistant MR50-grade MDF is particularly preferred as the MDF cores 38 and 44. The multiple ply materials may be made by, for example, employing a bladder-pressing technique. The three-ply constructions described herein exhibit significantly less swelling and shrinking movement than traditional 2-ply solid-wood panels.

The stiles 12 and 14 have channeled stile surfaces 12a and 14a extending across a thickness (shown in FIGS. 2 and 3) of the door 10 and facing one another on opposite sides of the panels 26 and 28. Likewise, the rails 16, 18, and 20 have channeled rail surfaces 16a, 18a, 20a, and 20b extending across the thickness of the door 20. Channeled rail surfaces 16a and 20a face one another on opposite ends of the panel 26, and channeled rail surfaces 18a and 20b face one another one opposite ends of the panel 28.

The channeled stile surfaces 12a and 14a and the channeled rail surfaces 16a, 18a, 20a, and 20b include channels with open ends and closed ends. In the interests of brevity and simplicity, the channels of the channeled surfaces 12a, 14a, 16a, 18a, 20a, and 20b are described in connection with channels 50, 50A, and 52 of FIGS. 6, 6A, and 7, respectively. The channels 50, 50A, and 52 may be routed into the stile surfaces 12a and 14a and the rail surfaces 16a, 18a, 20a, and 20b. The open ends of the channels 50, 50A, and 52 of the channeled surfaces 12a, 14a, 16a, and 20a receive the periphery of the upper panel 26 (FIGS. 6 and 6A), and the open ends of the channels 50, 50A, and 52 of the channeled surfaces 12a, 14a, 18a, and 20b receive the periphery of the lower panel 28 (FIG. 7).

Figure 6:
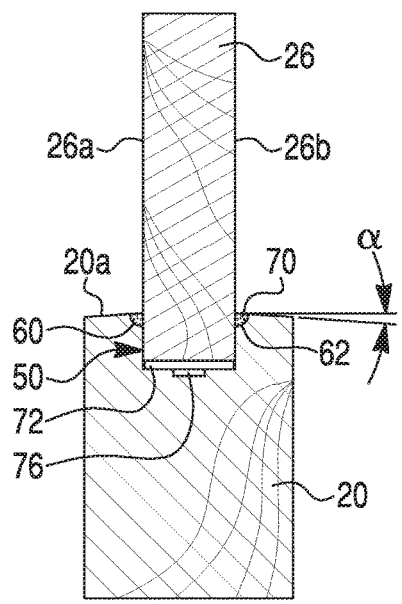
FIG. 6 is a cross-sectional view taken along sectional line 6-6 of FIG. 1.
Figure 6A:
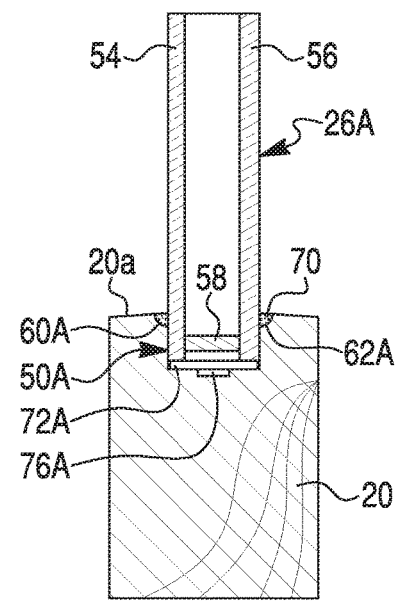
FIG. 6A is a cross-sectional view of an alternative embodiment taken along sectional line 6A-6A of FIG. 1.
Figure 7:
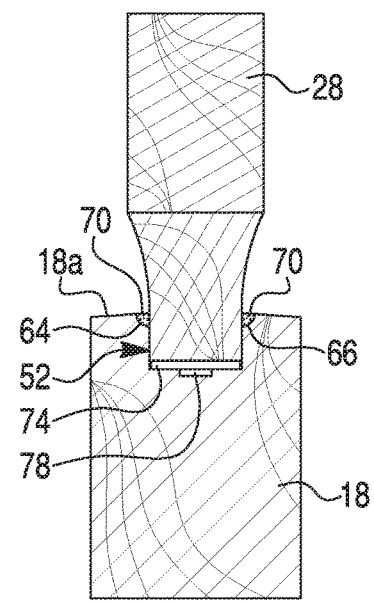
FIG. 7 is a cross-sectional view taken along sectional line 7-7 of FIG. 1.

In FIG. 6, the upper panel 26 is represented by a solid construction, preferably a solid wood or solid wood composite construction. FIG. 6A illustrates an alternative embodiment in which the wood panel 26 is replaced by an insulated glazing unit (IGU) 26A. The periphery of the IGU 26A is received in channels, including channel 50A illustrated in FIG. 6A. IGUs are known in the art. The illustrated IGU 26A includes first and second panes 54 and 56 spaced apart from one another by peripheral spacer 58. The panes 54 and 56 may be made of, for example, clear (transparent) sheet glass, tinted glass, textured glass, and/or patterned glass. Alternatively, the panes 54 and 56 may be made of other transparent or translucent materials or combinations of materials, including plastics such as acrylics and polycarbonate. Safety glass may also be used. A combination of plastic and glass panels may be used. Typically the IGU 26A includes at least two glazing panes separated by a spacer, although the IGU may include one, two, three, or more panels and spacers. IGUs are commercially available and often sold as pre-assembled products that can be incorporated into the doors embodied and described herein. The IGU 26A may be hurricane rated. IGU thickness may be, for example, standardized at ¾ inch.

The channeled stile surfaces 12a and 14a and the channeled rail surfaces 16a, 18a, 20a, and 20b include first sealant-receiving grooves positioned at first interfaces of a first panel surface and first edges of the open ends of the channels, and second sealant-receiving grooves positioned at second interfaces of the second panel surface and second edges of the open ends of the channels. The first sealant-receiving grooves are parallel to the second sealant-receiving grooves. In the interests of brevity and simplicity, the sealant-receiving grooves are described with respective to representative grooves 60 and 62 of FIG. 6, 60A and 62A of FIG. 6A, and 64 and 66 of FIG. 7.

FIG. 6 illustrates a first sealant-receiving groove 60 positioned in the channeled rail surface 20a at an interface of a first panel surface 26a and a first edge of the open end of the channel 50, and a second sealant-receiving groove 62 positioned in the channeled rail surface 20a at an interface of a second panel surface 26b and a second edge of the open end of the channel 50. Identical first and second sealant-receiving grooves 60 and 62 are similarly positioned in the channeled stile surfaces 12a and 14a and the channeled rail surface 16a.

FIG. 6A illustrates a first sealant-receiving groove 60A positioned in the channeled rail surface 20a at an interface of the outer surface of the pane 54 and a first edge of the open end of the channel 50A, and a second sealant-receiving groove 62A positioned in the channeled rail surface 20a at an interface of an outer surface of the pane 56 and a second edge of the open end of the channel 50A. Identical first and second sealant-receiving grooves 60A and 62A are similarly positioned in the channeled stile surfaces 12a and 14a and the channeled rail surface 16a.

FIG. 7 illustrates a first sealant-receiving groove 64 positioned in the channeled rail surface 18a at an interface of a first panel surface 28a and a first edge of the open end of the channel 52, and a second sealant-receiving groove 66 positioned in the channeled rail surface 18a at an interface of a second panel surface 26b and a second edge of the open end of the channel 52. Identical first and second sealant-receiving grooves 64 and 66 are similarly positioned in the channeled stile surfaces 12a and 14a and the channeled rail surface 18a.

Sealant is received in each of the sealant-receiving grooves. For example, the channels 60, 62, 60A, 62A, 64, and 66 are depicted receiving a sealant 70. The sealant 70 preferably is applied as continuous beads around the interfaces of the panels 26 (or 26A) and 28 and their respective stiles 12 and 14 and rails 16, 18, and 20. The sealant 70 desirably provides a water-proof seal at the first and second interfaces to prevent moisture from penetrating into the channels, e.g., channels 50, 50A, and 52 of FIGS. 6, 6A, and 7, respectively, and reaching unfinished wood surfaces of the channels 50, 50A, and 52 of the channeled surfaces 12a, 14a, 16a, 18a, 20a, and 20b. The sealant 70 desirably is paintable, stainable and resilient in order to allow movement of the panels 26, 28 relative to their surrounding stiles and rails. According to an exemplary embodiment, the sealant 70 is or includes an acrylic latex polymer, such as Acryl-R SM8500 of ITW Polymers Sealants North America.

The sealant desirably produces waterproof seals having a joint movement capability of at least 25% of the sealant width to permit limited movement of the door panels 26 or 28 relative to the respective surrounding stiles 12 and 14 and rails 16, 18, and 20 at the first and second interfaces without breaking the water-proof seals. Such movement may occur due to swelling and contraction of wood parts caused by seasonal temperature changes. The resilient sealant 70 may be applied as a continuous bead having a width of, for example, about 0.125 inch. The bead may be robot-applied with high precision and reliability, or may be manually applied.

The channeled stile surfaces and the channeled rail surfaces may slope at an oblique angle toward outer edges of the door 10. As a representative example of all of the channeled stile and rail surfaces, FIG. 6 depicts the channeled rail surface 20a sloping at an angle $\alpha$ toward outer edges of the door 10. An exemplary slope angle $\alpha$ is 5 degrees from perpendicular. The sloped profile allows for water drainage and reduces water accumulation on the channeled stile and rail surfaces.

The door 10 may further include spacer blocks or foam spacers, positioned in the channels between the peripheries of the panels 26 and 28 and the closed ends of the channels of the stiles 12 and 14 and the rails 16, 18, and 20. Preferably, spacer blocks are used in connection with IGUs (FIG. 6A) and veneered (MDF) panels (FIG. 9), while foam spacers are used in connection with multi-ply panels (FIG. 8), although it should be understood that spacer blocks may be used with multi-ply panels and foam spacers may be used with IGUs and veneered panels. Exemplary spacer blocks include neoprene (polychloroprene or pc-rubber) compounds, such as setting blocks available from Quanex Building Products Corp. (Houston, Tex.), used to isolate and elevate the IGU 26A from the sash and providing cushion to support the IGU 26A. Exemplary foam spacers include 11400RSO of Protac Industries Inc. Typically, foam spacers are greater in thickness than spacer blocks.

The spacer blocks or foam spacers control positioning of the panels 26 and 28. The hardness of the spacer blocks or foam spacers may be adjusted to allow for minor dimensional changes to the stiles 12 and 14 and the rails 16, 18, and 20. The durometer Shore 0 hardness of the foam spacers is desirably in a range of 12 to 17. For example, FIG. 6 shows a spacer block 72 positioned between the periphery of panel 26 and the closed end of the channel 50 of the channeled rail surface 20a of the intermediate rail 20. In FIG. 6A, a foam spacer 72A is positioned between the periphery of the IGU 26A and the closed end of the channel 50A of the channeled rail surface 20a of the intermediate rail 20. In FIGS. 5 and 7, a first spacer block 74 is positioned between the bottom peripheral surface of the panel 28 and the closed end of the channel 52 of the channeled rail surface 18a of the bottom rail 18, and in FIG. 7 a second spacer block 75 is positioned between the side peripheral surface of the panel 28 and the closed end of the channel of the stile 14. The spacer blocks 72 and 74 and the foam spacer 72A may be placed about part or all of the peripheries of the panels 26 and 28, including only at the bottom peripheral surfaces.

The closed ends (or bottoms) of the channels 50, 50A, and 52 may include elongated recesses positioned on an opposite side of the spacer blocks 72 and 74 or foam spacers 72A from the panels 26 and 28. The recesses may be formed in the closed ends of the channels 50, 50A, and 52 by routing. For example, FIGS. 6, 6A, and 7 illustrate recesses 76, 76A and 78, respectively. The recesses 76, 76A, and 78 may be empty, and provide space for aeration. FIGS. 6, 6A, and 7 show the recesses 76, 76A, and 78 centered at the closed ends (or bottoms) of the channels 50, 50A, and 52, although other locations along the closed ends may be utilized.

The illustrated embodiment maintains classic stile-and-rail style and appearance while also providing a sealed door face at the joints between the stiles/rails and the central panels that protects the beauty of wood and the structure of internal components, such as the IGU spacer 58 and exposed (MDF) internal surfaces of the grooves, which are susceptible to direct water damage. Keeping water out of this space helps preserve the longevity of the IGU spacer 58 and consequently reduces IGU seal failures. The resilient sealant 70 strategically located in sealant-receiving grooves at the intersections of panel surfaces and the open ends of the channels provides a water barrier that is maintained as the humidity, temperature changes, and other environmental elements affect the door. Solid wood panel design, joint design, and sealant bead water resistance and elasticity and placement ensure that when dimensional movement occurs in different wood components over time the seal integrity is maintained and water is kept on the outside surfaces. As a result, damage such as veneer splits, swelling bubbles, IGU seal failure, wood discoloration and rot are minimized as water does not infiltrate the unprotected inside of the door construction.

Fabrication as disclosed herein results in greatly improved waterization performance. Test door samples have passed ASTM-331 15 min test with 0.55" H2O pressure. Factory sealed panel performance is far superior to conventional doors that use floating panels without sealing of any kind, which can lead to failure. The factory sealed solution provides more consistent aesthetics as well as more reliable performance than hand-applied caulking. It also reduces cost and labor for the installer or customer.

Testing has also shown that improved waterization performance also reduces overall aesthetic defects on the door's surface. Test doors have been evaluated for Heatwall (4× cycles @ 180 deg, 6 hours), 90RH-90F conditioning (2 weeks) and slam cycle testing (250 000×) with positive results.

The door 10 may be made by assembling the stiles 12 and 14 and the rails 16, 18 and 20 into position around the central panels 26 and 28. Where tenon-and-mortise joints are used, adhesive may be applied to the tenons and/or within the mortises prior to assembly. The sealant 70 is then applied to the sealant-receiving grooves and allowed to dry. The door 10 may be painted, stained, and/or coated pre-assembly or post-assembly.

FIGS. 10-12 illustrate steps involved in the making of a door according to another embodiment of the invention. The door, generally designated by reference numeral 80 in FIG. 12, includes an insulating glass unit (IGU) 82 of the type described above with respect to IGU 26A of FIG. 6A. The above description of the IGU 26A is incorporated herein by reference as applying to the IGU 80. The IGU 80 includes a first pane 84 having a first pane exterior surface 85, a second pane 86 having a second pane exterior surface 87, and a peripheral spacer 88 between the first and second panes 84 and 86. Those skilled in the art will recognize that the IGU 80 may be located where the upper panel 26 was located in the door 10, with the lower panel 28 continuing as a wood or wood composite panel. Alternatively, the IGU 80 may be extend between the upper and lower rails and thus avoid the need for rail 20.

As best shown in FIGS. 10 and 11, an elastomeric film (or tape) 90 is wrapped or shaped about the periphery of the IGU 82 so as to establish a U-shape cross section. The U-shaped elastomeric film 90 includes a first leg 92 extending along an edge of the first pane exterior surface 85 and terminating at a first end 93, a second leg 94 extending along an edge of the second pane exterior surface 87 and terminating at a second end 95, and a base 96 connecting the first and second legs 92 and 94 and extending across the bottom edges of the first and second panes 84 and 86 and the peripheral spacer 88.

Referring now more particularly to FIG. 12, the IGU 82, preferably with the elastomeric film 90 pre-applied, is inserted into a channel 100 of a channeled surface 103 of a stile or rail 102 of the door 80. The channeled surface 103 includes a first sealant-receiving groove 104 positioned at a first interface of the first pane exterior surface 85 and a first edge of an open end of the channel 100. The channeled surface 103 further includes a second sealant-receiving groove 106 positioned at a second interface of the second pane exterior surface 87 and a second edge of the open end of the channel 100. Optionally, a recess 110 (similar to recesses 76, 76A, and 78 described above) is provided at the bottom of the channel 100. Although not shown, other edges of the IGU 82 may be mated with channeled surfaces of other rails and stiles surrounding the IGU 82 in the same manner.

Sealant 108 is received in each of the sealant-receiving grooves 104 and 106. The resilient sealant 108 preferably is applied as continuous beads around the interfaces of the IGU 82 and the stiles/rails 120. The sealant 108 desirably provides a waterproof seal at the first and second interfaces to prevent moisture from penetrating into the channel 100 and reaching unfinished wood surfaces of the channel 100. The sealant 108 desirably is paintable, stainable and resilient in order to allow movement of the IGU 82 relative to the surrounding stiles and rails. According to an exemplary embodiment, the sealant 108 is or includes an acrylic latex polymer, such as Acryl-R SM8500 of ITW Polymers Sealants North America.

The total thickness of the legs 92 and 94 of the elastomeric film 90 and the IGU 82 preferably is slightly greater than the width of the channel 100 of the stile or rail 102. As a consequence, the elastomeric film 90 is compressed when inserted into the channel 100, as shown in FIG. 12. Because the legs 92 and 94 on the opposite sides of the IGU 82 are made of the same elastomeric material, the expansion force imparted by the film 90 is equal on both sides of the IGU 82, causing the IGU 82 to be centered in the channel 100.

The elastomeric film 90 may be made of, for example, neoprene (polychloroprene). The elastomeric film 90 may have a thickness on the order of about 0.125 inch (125 mils or 0.3175 cm), and/or a durometer Shore A in a range of 20 to 60, preferably 40.

Those skilled in the art will understand that features of the embodiment of FIGS. 10-12, including the elastomeric film 90, may be incorporated into the embodiments described herein, including those of FIGS. 1-9. Conversely, features of the embodiments of FIGS. 1-9 may be incorporated into the embodiment of FIGS. 10-12.

The various components and features of the above-described exemplary embodiments may be substituted into one another in various combinations. It is within the scope of the invention to make the modifications necessary or desirable to incorporate one or more components and features of any one embodiment into any other embodiment. In addition, although the exemplary embodiments discuss steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to necessarily limit the invention to the precise embodiments disclosed.

What is claimed is:

1. A solid door, comprising:
   at least a first solid panel having a periphery and opposite first and second panel surfaces;
   stiles and rails collectively surrounding the first panel, the stiles having channeled stile surfaces extending across a thickness of the stiles and facing one another, the rails having channeled rail surfaces extending across a thickness of the rails and facing one another, each of the channeled stile surfaces and the channeled rail surfaces comprising
   a channel with an open end, the open end receives the periphery of the first panel,
   a sealant-receiving groove positioned adjacent to the channel at an interface of the first panel surface and a first edge of the open end of the channel; and
   a resilient sealant received in the sealant-receiving groove,
   wherein the first solid panel, the stiles, and the rails are composed of wood or a wood composite.

2. The door of claim 1, wherein the first panel comprises an insulated glazing unit.

3. The door of claim 1, wherein the first panel comprises laminated veneer lumber.

4. The door of claim 1, wherein the stiles and the rails are solid members extending between opposite surfaces of the door.

5. The door of claim 1, wherein the sealant comprises an acrylic latex polymer.

6. The door of claim 1, wherein the channeled stile surfaces and the channeled rail surfaces slope at an oblique angle toward outer edges of the door.

7. The door of claim 1, wherein the channel has a bottom surface comprising an empty recess.

8. The door of claim 1, wherein the sealant has a joint movement capability of at least 25% of a width of the sealant to permit movement of the first panel relative to the stiles and the rails at the first and second interfaces.

9. The door of claim 8, wherein the sealant provides a waterproof seal at the first and second interfaces.

10. The door of claim 1, further comprising a foam spacer positioned in the channel between the periphery of the solid panel and a bottom of the channel.

11. The door of claim 10, wherein the foam spacer comprises neoprene.

12. The door of claim 1, wherein each of the channeled stile surfaces and the channeled rail surfaces further comprises a second sealant-receiving groove positioned adjacent to the channel at an interface of the second panel surface and a second edge of the open end of the channel.

13. The door of claim 12, wherein the resilient sealant is received in the second sealant-receiving groove.

14. The door of claim 1, further comprising a compressed elastomeric film received in the channel and positioned about the periphery of the solid panel to contact the first and second panel surfaces.

15. The door of claim 14, wherein the elastomeric film comprises neoprene.

16. The door of claim 14, wherein the elastomeric film has a durometer Shore A in the range of 20 to 60.

17. A solid door, comprising:
   at least a first solid panel and a second solid panel, each of the first panel and the second panel having a periphery and opposite first and second panel surfaces;
   stiles and rails collectively surrounding the first panel and the second panel, the stiles having channeled stile surfaces extending across a thickness of the stiles and facing one another, the rails having channeled rail surfaces extending across a thickness of the rails and facing one another, each of the channeled stile surfaces and the channeled rail surfaces comprising
   a first channel with a first open end, the first open end receives the periphery of the first panel,
   a second channel with a second open end, the second open end receives the periphery of the second panel,
   a first sealant-receiving groove positioned adjacent to the first channel at an interface of the first panel surface and a first edge of the first open end of the first channel;
   a second sealant-receiving groove positioned adjacent to the second channel at an interface of the second panel surface and a first edge of the second open end of the second channel; and
   a resilient sealant received in each of the first sealant-receiving groove and the second sealant-receiving groove,
   wherein the first solid panel, the second solid panel, the stiles, and the rails are composed of wood or a wood composite.

18. The door of claim 17, wherein the first panel comprises one of an insulated glazing unit and laminated veneer lumber.

19. The door of claim 17, wherein the sealant comprises an acrylic latex polymer.

* * * * *